May 16, 1944.  C. W. HOWARD  2,348,907
ROTARY SEAL JOINT
Filed June 30, 1943  2 Sheets-Sheet 1
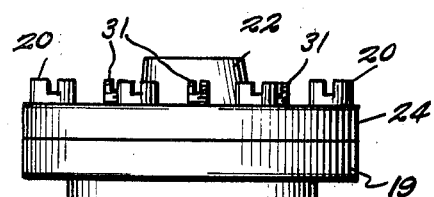
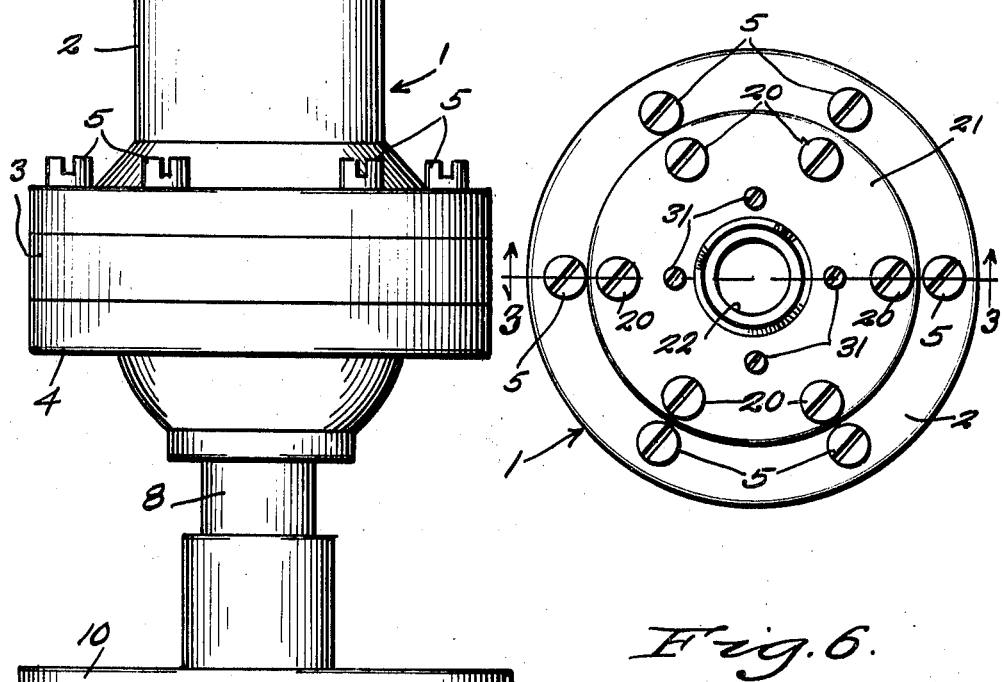
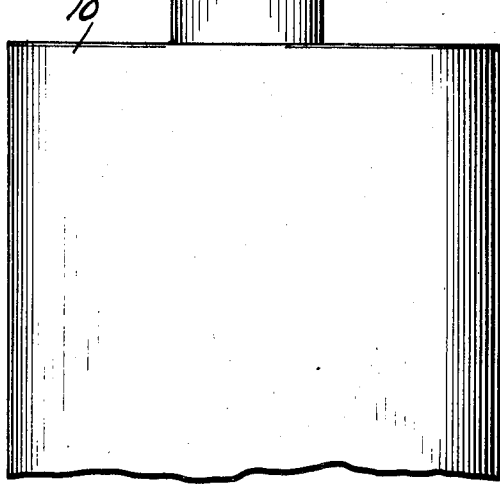
Inventor
Charles Willmott Howard
By Clarence A. O'Brien
and Harvey B. Jacobson
Attorneys

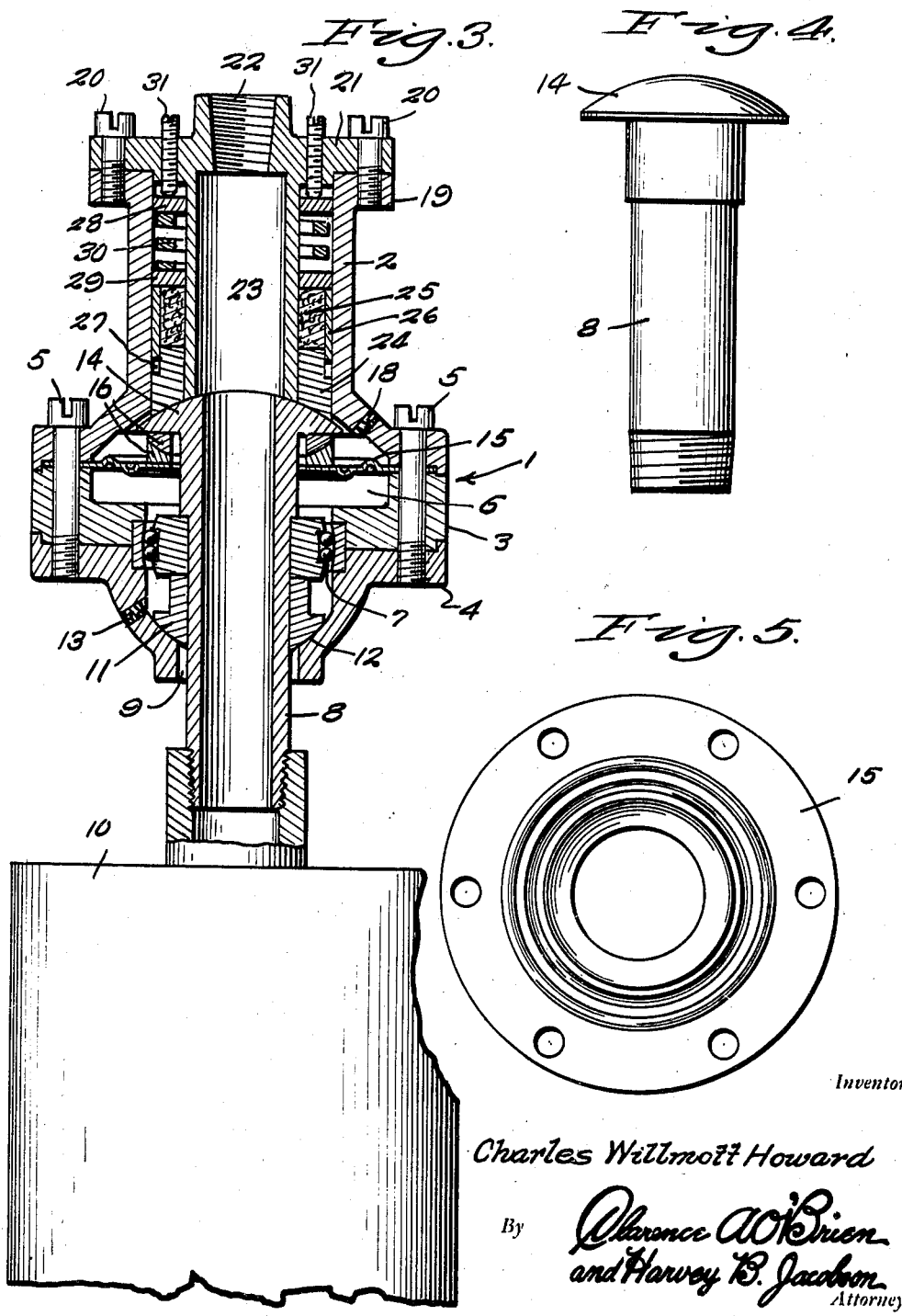

Patented May 16, 1944

2,348,907

UNITED STATES PATENT OFFICE 2,348,907

ROTARY SEAL JOINT

Charles Willmott Howard, Franklin, Ohio

Application June 30, 1943, Serial No. 492,927

3 Claims. (Cl. 285—97.3)

The present invention relates to new and useful improvements in rotary seal joints and has for one of its important objects to provide, in a manner as hereinafter set forth, a device of this character which is self-aligning and wherein the friction load will be kept at a minimum.

Another very important object of the invention is to provide a rotary seal joint of the aforementioned character embodying a novel construction and arrangement for compensating for expansion and contraction of the piping; also to compensate for any misalignment that may occur when assembling the seal to moving parts.

Other objects of the invention are to provide a rotary low pressure sealing joint of the character described which will be comparatively simple in construction, strong, durable, highly efficient and reliable in use, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein—

Figure 1 is an elevational view of a rotary seal joint constructed in accordance with the present invention, showing the device connected to a cylinder.

Figure 2 is a top plan view of the device.

Figure 3 is a vertical sectional view through the joint, taken substantially on the line 3—3 of Figure 1.

Figure 4 is a detail view in elevation of the lower tube and the segmental ball seat thereof.

Figure 5 is a detail view in plan of the flat, resilient ring constituting one of the sealing members of the bearing chamber.

Figure 6 is a detail view in elevation of the segmental ball seal in the lower portion of the bearing chamber.

Referring now to the drawings in detail, it will be seen that the embodiment of the invention which has been illustrated comprises a housing of suitable metal which is designated generally by reference numeral 1. The housing 1 includes sections 2, 3 and 4 which are secured together by screws 5.

As illustrated to advantage in Figure 3 of the drawings, the sections 3 and 4 of the housing 1 are formed to provide a lubricant chamber 6. Mounted in the chamber 6, between the housing sections 3 and 4, is a suitable self-aligning bearing 7. A tube 8 is journaled in the bearing 7, said tube extending downwardly through the opening 9 in the lower end of the housing 1 for connection in any suitable manner with a cylinder, as at 10. A segmental ball seal 11 encircles the tube 8 for closing the opening 9 around said tube for retaining the lubricant in the chamber 6 and for excluding foreign matter. The ball seal 11 is engageable with the seat 12 which is provided therefor in the lower portion of the chamber 6. A filler plug 13 is provided for the chamber 6.

The tube 8 has formed integrally with its upper end a segmental ball seat 14. Secured between the sections 2 and 3 of the housing 1 is a substantially flat, resilient ring 15 through which the tube 8 passes. It will be observed that the segmental ball seat 14 overlies the ring 15. Mounted between the ball seat 14 and the ring 15 are sealing rings 16 which are yieldingly pressed upwardly by the latter. The elements 15 and 16 close and seal off the chamber 6 and retain the lubricant therein. The elements 15 and 16 also provide an upper chamber 17 in the section 2 of the housing 1, in which chamber the segmental ball seat 14 is operable. A drain plug 18 is provided for the chamber 17.

The upper end of the housing section 2 is flanged, as at 19, and secured thereon by screws 20 is an end cap 21 having an inlet opening 22 therein. Depending from the end cap 21 in spaced, concentric relation to the housing section 2 is a tube 23 which communicates with the tube 8. The lower end of the tube 23 is closely adjacent or in light contact with the segmental ball seat 14 and conforms to the shape thereof.

Slidably mounted on the lower portion of the tube 23 is a sealing ring 24 which rests on the segmental ball seat 14. A packing 25 of suitable material is provided in the housing section 2 above the ring 24, said packing 25 being enclosed in a retaining ring 26. The ring 26, which prevents the packing 25 from contacting the housing section 2, is slidable in said housing section. The ring 26 is also slidable on the sealing ring 24. The sealing ring 24 has its upper portion recessed, as at 27, to accommodate the ring 26.

Compressing rings 28 and 29 are mounted in the upper portion of the housing section 2 and encircle the tube 23, said ring 29 resting on the packing 25 and the ring 26. A coil spring 30 is mounted between the rings 28 and 29. Adjusting screws 31 are threadedly mounted in the end cap 21 for regulating the tension of the spring 30 for preventing leakage past the elements 24 and 25.

It will be observed that the construction and arrangement is such that the housing 1 and the assembly therein is mounted for universal movement on the stationary tube 8, said housing and assembly swiveling on the self-aligning bearing 7 while at the same time maintaining the sealing contact between the tube 23, the ring 24 and the segmental ball seat 14. The construction also is such that comparatively little pressure is required to maintain the seal between the elements 24 and 14.

It is believed that the many advantages of a rotary seal joint constructed in accordance with the present invention will be readily understood, and although a preferred embodiment of the device is as illustrated and described, it is to be understood that changes of the details of construction and in the combination and arrangement of parts may be resorted to which will fall within the scope of the invention as claimed.

What is claimed is:

1. A rotary seal joint comprising a tube, a segmental ball seat on one end of the tube, a self-aligning bearing mounted on the tube, a housing rotatably and rockably mounted on the bearing for universal movement on the tube, a resilient ring in the housing encircling the tube, sealing rings between the first-named ring and the seat, said rings defining a lubricant chamber in the housing for the bearing, a closure on one end of the housing, said closure having an inlet therein, a tube on the closure communicating with the inlet and the first-named tube, and means for sealing the joints between the first- and second-named tubes.

2. A rotary seal joint comprising a tube, a segmental ball seat on one end of the tube, a self-aligning bearing mounted on the tube, a housing rotatably and rockably mounted on the bearing for universal movement on the tube, a resilient ring in the housing encircling the tube, sealing rings between the first-named ring and the seat, said rings defining a lubricant chamber in the housing for the bearing, a closure on one end of the housing, said closure having an inlet therein, a tube on the closure communicating with the inlet and the first-named tube, and means for sealing the joints between the first- and second-named tubes, said means including a ring slidably encircling the second-named tube and engaged with the seat, one end of said second-named tube also bein gengaged with the seat, a packing in the housing around the second-named tube and engaged with the last-named ring, and resilient means in the housing for compressing the packing and for engaging said last-named rings with the seat.

3. A rotary seal joint of the character described comprising a tube, a segmental ball seat on one end of the tube, a self-aligning bearing mounted on the tube, a housing mounted for universal movement on the bearing, said housing having a lubricant chamber therein accommodating the bearing, a substantially flat, resilient ring in the housing encircling the tube, sealing rings encircling the tube between the first-named ring and the seat and yieldingly engaged with the latter by said first-named ring, and a sealing ring in the housing engaged with and operable on the seat.

CHARLES WILLMOTT HOWARD.